3,573,052
DIAZOTYPE MATERIALS OF IMPROVED STABILITY

William C. Gray and Frederick A. Stahly, Rochester, N.Y., assignors to Eastman Kodak Company, Rochester, N.Y.
No Drawing. Filed Oct. 30, 1967, Ser. No. 679,176
Int. Cl. G03c 1/54, 1/58, 1/60
U.S. Cl. 96—91                                    6 Claims

ABSTRACT OF THE DISCLOSURE

The fading of azo dyes is inhibited by the presence of certain polymeric materials, both alone and in combination with certain hindered phenols which are substituted in the 2-position and in the 4-position. These stabilizing polymers are particularly useful as binder materials in diazotype reproduction media, especially the "two component" media containing a diazonium salt, a blue coupler and a yellow coupler in proportions sufficient to yield an azo dye image of neutral hue after exposure and development.

---

This invention relates to photography and in particular to the stabilization of photographic azo dyes.

Azo dyes are widely used in photographic systems, for example, in dye-bleach and diazo processes. However, due to their susceptibility to oxidation, may azo dyes undergo disadvantageous fading.

Accordingly, it is an object of this invention to provide new stabilizers for azo dye compositions.

It is also an object of this invention to provide novel stabilized azo dye compositions.

Another object of the present invention is to provide new diazotype compositions which, when developed, incorporate stabilized azo dyes.

These and additional objects of the present invention will become apparent from a consideration of the following specification and appended claims.

The objects of this invention are accomplished with compositions comprising at least one azo dye in admixture with a least one polymer which is selected from either: (1) copolymers of vinyl chloride and vinyl acetate; (2) polyvinylbutyral homopolymers; (3) polyvinyl acetate homopolymers; (4) copolymers of 4,4'-isopropylidenebisphenol and 1-chloro-2,3-epoxypropane (Bis phenol A and epichlorohydrin); (5) terpolymers of ethylene glycol, isophthalic acid and terephthalic acid; (6) polyvinylchloride homopolymers; (7) terpolymers of p-cyclohexanedicarboxylic acid, isophthalic acid and cyclohexylenebismethanol; (8) copolymers of p-cyclohexanedicarboxylic acid and 2,2,4,4-tetramethylcyclobutane-1,3-diol; or (9) copolymers of ethylacrylate and acrylic acid.

Of the subject polymers, particularly suitable polymers include:

(a) Copolymers of vinyl chloride and vinyl acetate wherein the ratio of vinyl chloride units to vinyl acetate units is in excess of one and most preferably ranging from about 4:1 to about 19:1, (b) Polyvinylbutyral homopolymers having hydroxylated aldehyde units and preferably from about 9% to about 21% hydroxylated aldehyde units, (c) Polyvinyl acetate homopolymers wherein the molecular weight varies from about 70,000 to about 110,000, (d) Copolymers of 4,4'-isopropylidenebisphenol and 1-chloro-2,3-epoxypropane wherein the molecular weight is in excess of 50,000 and preferably from about 75,000 to about 150,000, (e) Terpolymers of ethyleneglycol, isophthalic acid and terephthalic acid wherein the ratio of ethylene units to total acid units varies from 4:6 to 6:4.

(f) Polyvinyl chloride homopolymers wherein the polymer is additionally postchlorinated, (g) Terpolymers of p-cyclohexanedicarboxylic acid, isophthalic acid, and cyclohexylenebismethanol wherein the ratio of units varies respectively from about 6:4:10 to about 9:1:10, (h) Copolymers of p-cyclohexanedicarboxylic acid and 2,2,4,4-tetramethylcyclobutane-1,3-diol wherein the ratio of units varies respectively from about 3:2 to about 2:3, and (i) Copolymers of ethyl acrylate and acrylic acid wherein the ratio of units varies respectively from about 9:1 to about 7:3.

As noted herein, the subject polymers are admixed with azo dyes. Typically, azo dyes (dyes containing at least one —N=N— azo linkage and generally produced by the reaction of a diazonium salt and a coupler compound containing an active hydrogen atom) are susceptible to oxidation-induced fading. When such an azo dye is admixed with the polymeric materials of this invention, it exhibits a decreased tendency towards oxidation, and in this fashion the subject polymers promote the retention of the initial azo dye density. Mixtures of an azo dye and the subject polymers are typically in the amount of from about 5 to 50 parts by weight of polymer per one part by weight of dye, but more extensive variations are possible if desired or needed. In general, less than about 2 parts of polymer per part of dye does not adequately increase stability and more than 75 to 100 parts of polymer per part of dye does not significantly enhance stability over a ratio of, for example, 50 parts of polymer per part of dye.

Although azo dyes are stabilized by the polymers of this invention, additional dye stability is obtained with the conjunctive use of such polymers and a hindered phenol. Hindered phenols which are advantageously employed in association with the polymers of this invention include those hindered phenols containing, in the 2-position, either an alkyl or a cycloalkyl radical and, in the 4-position, either an alkyl radical, an alkoxy radical, a hydroxyl radical or a thioether radical which with the hindered phenolic moiety completes a hindered bisthiophenol, and more generally, a symmetrical bis-thiophenol.

Typical useful hindered phenols employed herein include those having the formulas:

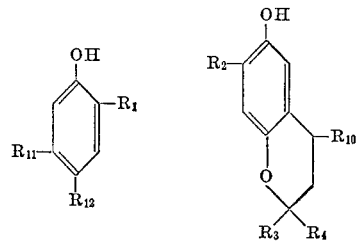

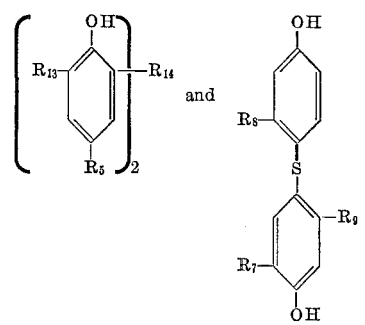

wherein each of $R_1$ through $R_9$ is an alkyl radical; each of $R_{10}$ and $R_{11}$ is either a hydrogen atom or an alkyl radical; $R_{12}$ is either a hydroxyl radical, an alkyl radical or an alkoxy radical; $R_{13}$ is either an alkyl radical or a cycloalkyl radical; and $R_{14}$ is a lower alkylene radical.

As comprehended herein, an alkyl radical is a straight or branched chain alkyl radical having from 1 to about 18 carbon atoms. Typical such alkyl radicals are, for example, methyl, ethyl, isopropyl, tert-butyl, tert-octyl, dodecyl, tetradecyl and the like. Cycloalkyl radicals as described herein are saturated monovalent carbocyclic radicals having 4 to 6 nuclear carbon atoms, such as a cyclobutyl, cyclopentyl, cyclohexyl, 1 - methylcyclohexyl and the like radicals. Alkoxy radicals, as defined herein, are straight or branched chain alkoxy radicals having from 1 to about 18 carbon atoms. Illustrative alkoxy radicals are methoxy, carboxymethoxy, ethoxy, butoxy, octoxy, dodecoxy, tridecoxy, α-ethoxycarbonyltridecoxy and the like. Lower alkyl and alkoxy radicals herein are typically straight or branched chain alkyl or alkoxy radicals having from 1 to 8 carbon atoms, with from 1 to 4 carbon atoms being preferred. Typical such radicals are, for example, methyl, methoxy, ethyl, ethoxy, propyl, isopropyl, propoxy, tert-butyl, butoxy, octyl, octoxy etc. Lower alkylene radicals as noted herein are alkylene radicals having from 1 to 4 carbon atoms, such as methylene, ethylene, propylene and butylene.

Particularly useful hindered phenols employed in the subject invention include compounds of the formula:

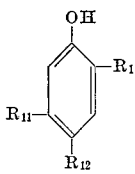

wherein $R_1$ is an alkyl radical and preferably a tertiary alkyl radical having 4 to 8 carbon atoms; $R_{12}$ is either a hydroxyl radical, an alkyl radical or an alkoxy radical; and $R_{11}$ is (1) a hydrogen atom when $R_{12}$ is an alkyl radical, (2) an alkyl radical when $R_{12}$ is a hydroxyl radical and (3) either a hydrogen atom or an alkyl radical when $R_{12}$ is an alkoxy radical; compounds of the formula:

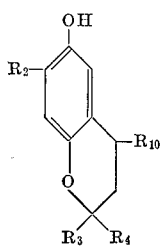

wherein each of $R_2$ to $R_4$ is an alkyl with $R_3$ and $R_4$ preferably being methyl radicals and $R_{10}$ is either a hydrogen atom or an alkyl radical; compounds of the formula:

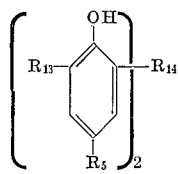

wherein $R_5$ is an alkyl radical, $R_{13}$ is either an alkyl radical or a cycloalkyl radical and $R_{14}$ is a lower alkylene radical, preferably a methylene or an ethylene radical; and compounds of the formula:

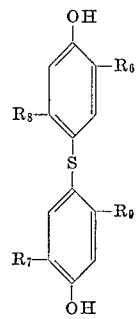

wherein each of $R_6$ to $R_9$ is an alkyl radical and $R_6$ and $R_7$ are preferably tertiary alkyl radicals having from 4 to 8 carbon atoms.

Typical specific hindered phenols useful in the invention include, for example, such compounds as:

(a) 2-tert-butyl-4-(α-ethoxycarbonyltridecyloxy)phenol,
(b) 2-tert-butyl-4-dodecoxyphenol,
(c) 2-tert-butyl-4-methoxyphenol,
(d) 2-tert-butyl-4-(carboxymethoxy)phenol,
(e) 2-tert-octyl-4-methoxyphenol,
(f) 2,5-di-tert-butyl-4-methoxyphenol,
(g) 2-tert-butyl-4-methylphenol,
(h) 2-tert-octyl-4-methylphenol,
(i) 2,5-di-tert-butylhydroquinone,
(j) 2,5-di-tert-octylhydroquinone,
(k) 2,2-dimethyl-4-isopropyl-7-tert-butyl-6-chromanol,
(l) 2,2-dimethyl-4-isopropyl-7-tert-octyl-6-chromanol,
(m) 2,2-dimethyl-4-isopropyl-7-tetradecyl-6-chromanol,
(n) 2,2,4-trimethyl-7-isopropyl-6-chromanol,
(o) 2,2-dimethyl-7-tert-butyl-6-chromanol,
(p) 2,2'-methylenebis[6-(1-methylcyclohexyl)-4-methylphenol],
(q) 2,2'-methylenebis(6-tert-butyl-4-methylphenol),
(r) 2,2'-methylenebis(6-tert-butyl-4-ethylphenol),
(s) 2,2'-methylenebis(4,6-di-tert-butylphenol), and
(t) 4,4'-thiobis(2-tert-butyl-5-methylphenol).

The subject polymers, both alone and in combination with the hindered phenols useful herein, can be employed in conjunction with azo dyes such as those produced in photographic systems by the reaction of a benzene diazonium salt with couplers such as compounds containing an active hydrogen bonded to carbon, e.g., phenols, aromatic amines, compounds having an enolizable ketone group on an aliphatic chain, heterocyclic compounds containing pyrrole, indole, and similar ring systems and the like compounds. The stabilizers of this invention are preferably employed in photographic systems with azo dyes derived from benzene diazonium salts and phenolic couplers.

Typical benzene diazonium salts include those of the formula:

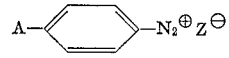

wherein A is either a hydrogen atom, a halogen atom, an aryl radical, an amino radical (including substituted amino radicals), or a substituted mercapto radical and Z is an anion. These compounds can also be substituted on one or more of the nuclear carbons with at least one of either a halogen atom, an alkyl radical, an alkoxy radical, an acyl radical, a carbamyl radical, a carboxyl radical or a nitro radical.

Particularly useful compounds within the scope of this invention include benzene diazonium salts having the formula as described above wherein A is either an amino radical including substituted amino radicals or a substituted mercapto radical, and wherein the benzene nucleus is unsubstituted or substituted in at least one of the 2-position and the 5-position with either an alkyl radical or an alkoxy radical. This class of useful diazonium salts can be represented by the formula:

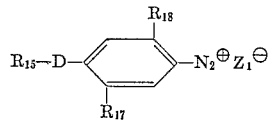

wherein:

(1) D is either a sulfur atom or a radical having the formula $NR_{16}$, (2) $R_{15}$, when taken alone, is either a hydrogen atom when D is $NR_{16}$, or a lower alkyl radical, a lower alkoxy radical, a lower acyl radical, an aryl radical having a nucleus of 6 carbon atoms, or an aralkyl radical when D is either a sulfur atom or $NR_{16}$, (3) $R_{16}$, when taken alone, is either a hydrogen atom, a lower alkyl radical or a lower alkoxy radical, (4) $R_{15}$ and $R_{16}$, when taken together, complete a divalent radical having the formula:

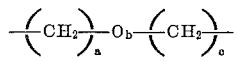

wherein $b$ is an integer having a value of 0 or 1, each of $a$ and $c$ is a positive integer, and the sum of $a$, $b$ and $c$ has a value of 5, (5) $R_{17}$ and $R_{18}$ are each either a hydrogen atom, a lower alkyl radical (preferably methyl or ethyl) or a lower alkoxy radical (preferably methoxy or ethoxy), and (6) $Z_1$ is an anion.

Preferred benzene diazonium salts include the substituted amino benzene diazonium salts having the formula:

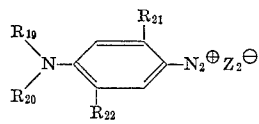

wherein:

(1) each of $R_{19}$ and $R_{20}$, when taken alone, is a lower alkyl radical, (2) $R_{19}$ and $R_{20}$, when taken together, are the number of carbon and hetero oxygen atoms necessary to complete a morpholino radical, (3) each of $R_{21}$ and $R_{22}$ is either a hydrogen atom, a lower alkyl radical or a lower alkoxy radical, and (4) $Z_2$ is either a chlorozincate anion, a fluoborate anion or a chlorostannate anion.

The most preferred benzene diazonium salts are the fluoroborate salts wherein (a) $R_{21}$ and $R_{22}$ are alkoxy radicals when $R_{19}$ and $R_{20}$ complete a morpholino radical and (b) $R_{21}$ and $R_{22}$ are each a hydrogen atom when $R_{19}$ and $R_{20}$ are each a lower alkyl radical.

Illustrative of the subject diazonium salts are such compounds as the salts of 1-diazo-2,5-dimethoxybenzene;
1-diazo-2,5-diethoxybenzene;
1-diazo-4-chloro-2,5-diethoxybenzene;
4-diazo-2,5-dimethoxybiphenyl;
4-diazo-2,5,4'-triethoxybiphenyl;
1-diazo-4-dimethylaminobenzene;
1-diazo-4-(diethoxyamino)-benzene;
1-diazo-4-[bis(hydroxypropyl)amino]benzene;
1-diazo-4-(N-methyl-N-allylamino)benzene;
1-diazo-4-(diamylamino)benzene;
1-diazo-4-(oxazolidino)benzene;
1-diazo-4-(cyclohexylamino)-benzene;
1-diazo-4-(9-carbazolyl)benzene;
1-diazo-4-(dihydroxy-ethylamino)-3-methylbenzene;
1-diazo-4-dimethylamino-3-methylbenzene;
1-diazo-2-methyl-4-(N-methyl-N-hydroxypropylamino)-benzene;
1-diazo-4-dimethylamino-3-ethoxybenzene;
1-diazo-4-diethylamino-3-chlorobenzene;
1-diazo-2-carboxy-4-dimethylaminobenzene;
1-diazo-3-(2-hydroxyethoxy)-4-pyrrolidinobenzene;
1-diazo-2,5-diethoxy-4-acetoxyaminobenzene;
1-diazo-4-methylamino-3-ethoxy-6-chlorobenzene;
1-diazo-2,5-dichloro-4-benzylaminobenzene;
1-diazo-4-phenylaminobenzene;
1-diazo-4-morpholinobenzene;
1-diazo-4-morpholino-3-methoxybenzene;
1-diazo-4-morpholino-2,5-dimethoxybenzene;
1-diazo-4-morpholino-2-ethoxy-5-methoxybenzene;
1-diazo-4-morpholino-2,5-dibutoxybenzene;
1-diazo-2,5-diethoxy-4-benzoylaminobenzene;
1-diazo-2,5-dibutoxy-4-benzoylaminobenzene;
1-diazo-4-ethylmercapto-2,5-diethoxybenzene;
1-diazo-4-tolylmercapto-2,5-diethoxybenzene and the like.

The couplers which can be reacted with the benzene diazonium salt to form the dye which is stabilized against fade in accordance with this invention include those disclosed by Kosar, "Light-Sensitive Systems," John Wiley & Sons, Inc., New York (1965), pp. 220–240. Phenolic couplers are preferred, however, with particularly preferred classes including:

(A) As blue couplers, 2-hydroxy-3-naphthanilides having the formula:

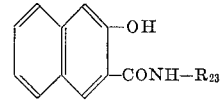

wherein $R_{23}$ is a phenyl radical, and preferably a phenyl radical substituted with a least one of either a lower alkyl radical or a lower alkoxy radical or a halogen atom;

(B) As yellow couplers, 1-hydroxy-2-naphthamides having the formula:

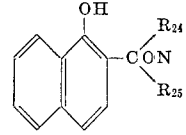

wherein (1) each of $R_{24}$ and $R_{25}$, when taken alone, is either a hydrogen atom or an alkyl radical, a cycloalkyl radical, an aryl radical, an aralkyl radical and the like hydrocarbon or substituted hydrocarbon radicals, (2) $R_{24}$ and $R_{25}$, when taken together represent the carbon and oxygen atoms necessary to complete a six-membered hetero piperidino or morpholino radical, and (C) As yellow couplers, 2-acylamido-5-substituted phenols having the formula:

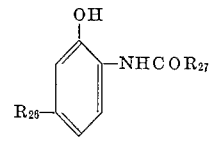

wherein $R_{26}$ is either an alkyl radical or an alkoxy radical and $R_{27}$ is either an alkyl radical, an aryl radical, an aralkyl radical or an aralkoxy radical.

Illustrative of the subject couplers are such compounds as for example, 2-hydroxy-3-naphthanilide;
2-hydroxy-2'-methyl-3-naphthanilide;
2-hydroxy-2',4'-dimethoxy-5'-chloro-3-naphthanilide;
2-hydroxy-2',4'-dimethoxy-3-naphthanilide;
2-hydroxy-2',5'-dimethoxy-4'-chloro-3-naphthanilide;
2-hydroxy-1'-naphthyl-3-naphthanilide;
2-hydroxy-2'-naphthyl-3-naphthanilide;
2-hydroxy-4'-chloro-3-naphthanilide;
2-hydroxy-3-naphthanilide;
2-hydroxy-2',5'-dimethoxy-3-naphthanilide;
2-hydroxy-2',4'-dimethyl-3-naphthanilide;
1-hydroxy-2-naphthamide;
N-methyl-1-hydroxy-2-naphthamide;

N-butyl-1-hydroxy-2-naphthamide;
N-octadecyl-1-hydroxy-2-naphthamide;
N-phenyl-1-hydroxy-2-naphthamide;
N-methyl-N-phenyl-1-hydroxy-2-naphthamide;
N-(2-tetradecyloxyphenyl)-1-hydroxy-2-naphthamide;
N-[4-(2,4-di-tert-amylphenoxy)butyl]-1-hydroxy-
  2-naphthamide;
1-hydroxy-2-naphthopiperidide;
N-(3,5-dicarboxyphenyl)-N-ethyl-1-hydroxy-2-naphtha
  amide;
N,N-dibenzyl-1-hydroxy-2-naphthamide;
N-(2-chlorophenyl)-1-hydroxy-2-naphthamide;
N-(4-methoxyphenyl)-1-hydroxy-2-naphthamide;
1-hydroxy-2-naphthopiperizide;
1,3-bis(1-hydroxy-2-naphthamidobenzene);
2-acetamido-5-methylphenol;
2-acetamido-5-pentadecylphenyl;
2-butyramido-5-methylphenol;
2-(2,4-di-tert-amylphenoxyacetamido)-5-methylphenol;
2-benzamido-5-methylphenol;

and the like.

Although the polymers of this invention, either alone or in association with the hindered phenols, can be employed with azo dyes for any use, they are of particular utility as additives to diazotype reproduction media, especially to so-called "two component" media which prior to exposure and development comprise a polymeric matrix containing at least one benzene diazonium salt and at least one coupler, because of the desirability of providing a stable image in such media. Systems of this type which are particularly sensitive to dye fade are those recently developed systems containing at least one benzene diazonium salt, at least one blue-dye-forming coupler, and at least one yellow-dye-forming coupler, in proportions such that on exposure and development there is obtained a neutral, i.e., black and white, dye image. Truly neutral images are very difficult to obtain because of the necessity of matching diazonium salts and couplers as to reaction rate, color balance and rate of dye fade. The use of the subject polymers, both alone and with hindered phenols in accordance with this invention, facilitates development of systems of this type by eliminating dye fade as one variable which must be considered.

Binder materials in diazotype reproduction media must possess suitable permeability to the alkaline processing solutions, especially ammonia, which are used in diazo systems. Cellulose esters such as cellulose acetate and cellulose acetate butyrate are typically used, but they do not promote advantageous dye stability. The polymeric materials of this invention, in addition to fulfilling a desirable stabilization function, also exhibit an alkaline permeability such that they are susceptible of use as binder materials in diazotype reproduction media. Although the amount of binder used in a diazotype photographic element is subject to wide variation, using the dye forming diazonium salt and coupler as a reference, concentrations ranging from about 20 to about 40 parts by weight of dye-forming ingredients per 100 parts of polymeric binder are typical, with concentrations in the range from about 25 to about 35 parts per 100 parts of matrix polymer being preferred.

When the subject polymers are used in conjunction with a hindered phenol as described herein, the fade-inhibiting amount of phenol is subject to wide variation, but ordinarily will be in the range of from about 0.1 to about 4 moles of phenolic stabilizer per mole of azo dye. Molar ratios of less than about 0.1:1 are generally insufficient to provide advantageous stabilization, and little or no further improvement in dye stability is ordinarily obtained when molar ratios of greater than 4:1 are employed. Preferred ratios are in the range of from about 0.5:1 to about 3:1 and most preferably from about 0.8:1 to about 2.5:1. The hindered phenol can be admixed with the dye to be stabilized or as in the case of diazotype reproduction media can be admixed with the benzene diazonium salt and coupler prior to a dye-forming reaction. In the latter instance, the above-mentioned ratios are based upon the amount of dye theoretically formed on development. However, because couplers are normally employed in molar excess over the benzene diazonium salt to ensure complete conversion of the salt to the dye, the ratios may be conveniently based upon the salt itself.

Diazotype reproduction media can also contain other additives to modify the properties of the film, such as ultraviolet absorbers, acid stabilizers and the like. A preferred class of additives comprises the known acid stabilizers which prevent premature coupling of the azo salt and the coupler. These acid stabilizers include organic acids such as 5-sulfosalicylic acid and the like. The organic acids are employed in an amount normally varying from about 1 to about 6, and preferably from about 2 to about 5, parts by weight per 100 parts of polymeric binder. Other typical additives are metal salts, such as zinc chloride, which are used as dye brighteners or development accelerators. The metal salts are normally present in an amount varying from about 0.5 to about 2 parts, and preferably from about 1 to about 1.5 parts, by weight per 100 parts of matrix polymer.

Dye-forming components, dye stabilizers, dye brighteners and other additives, when employed, are dispersed in the polymeric binder by any convenient technique, preferably by admixing all components in a common solvent. A particularly preferred solvent system comprises a mixture of a halogenated aliphatic hydrocarbon, especially ethylene chloride, and an alkanol, especially ethanol. The order of addition of the ingredients can be varied, although it is preferred that acid stabilizers be added to the solution prior to the diazonium salts. Similarly, the amount of solvent is variable, although it is preferred that the resulting solution contain from about 5 to about 15 weight percent solids, and preferably from about 8 to about 12 percent solids.

The resulting solution is then coated in accordance with generally known techniques. Although not essential, it is preferred that the film be cast on a suitable transparent or opaque support material such as cellulose acetate, polyethylene terephthalate, polystyrene, or paper, preferably coated with one of the above materials or suitably subbed with, for example, barium sulfate and the like. The solution is applied to the support at a rate sufficient to provide an optical density, when developed, of between .8 and 3, with densities typically ranging from 1 to 2. The resulting product can be exposed an developed in any conventional manner, typically in alkaline media such as an ammonia atmosphere, to produce a stabilized azo dye image.

The following examples illustrate preferred embodiments of the subject invention. In the examples, all parts are by weight.

EXAMPLE I

A diazotype emulsion is prepared by adding 65.0 parts of cellulose acetate to a solution of 568.4 parts of 1,2-dichloroethane and 189.5 parts of ethanol, followed by 2.2 parts of 5-sulfosalicylic acid. To the resulting solution there is added 6.8 parts of 4-(diethylamino)benzene diazonium chlorozincate, 3.8 parts of 2-hydroxy-3-naphtho-anisidide, 2.9 parts of 1-hydroxy-2-naphthoyl piperidide and 2.5 parts of 2-(2,6-diethylphenylimino)-3-hexadecyl-5-(2-methoxybenzylidene) thiazolidone to provide a solution containing 10 percent solids. After filtering, the solution is coated on subbed 4 ml. poly(ethylene terephthalate support at a coverage of about 0.6 g./ft.$^2$. The resulting photographic element is cured at 75° C. for 4 minutes. After development by processing with aqueous ammonia vapors, the developed element bearing a neutral hue azo dye image receives from a Xenon arc light (approximating daylight radiation), a uniform surface illumination of 5000 foot-candles for 24 hours. The optical density of the exposed dye image is measured at the maximum absorption spectrum for each of the blue and yellow dyes. These values, when compared with the dye densities prior to the Xenon arc illumination, show a 27 percent density loss for the blue dye and a 39 percent density loss for the yellow dye.

lar form. All receive the 24 hour Xenon arc exposure as noted in Example I.

| Binder | No dye stabilizer | | Stabilizer A | | Stabilizer B | | Stabilizers A and B | |
|---|---|---|---|---|---|---|---|---|
| | Percent loss yellow | Percent loss blue | Percent loss yellow | Percent loss blue | Percent loss yellow | Percent loss blue | Percent loss yellow | Percent loss blue |
| Cellulose acetate | 39 | 27 | 26 | 18.5 | 32 | 13 | 25 | 14 |
| Copoly(4,4'-isopropylidene-bisphenol/1-chloro-2,3-epoxy-propane) | 24 | 18 | 12 | 9 | 13 | 6.5 | 9 | 9 |
| Vinyl chloride/vinyl acetate | 15 | 17 | 3.2 | 5.3 | 11 | 3 | | |
| Polyvinylbutyral | 27 | 29 | 15 | 20 | 22 | 13 | 16 | 15 |

EXAMPLE II

A diazotype photographic element is prepared according to the procedure of Example I, except that the constituent parts of the diazotype emulsion are in parts by weight as follows:

| | |
|---|---|
| Acetone | 85.0 |
| 1,2-dichloropropane | 468.0 |
| Methoxyethyl acetate | 468.0 |
| Ethoxyethyl acetate | 255.0 |
| 5-sulfosalicylic acid | 7.7 |
| Copoly(2,2 - isopropylidenebisphenol/1 - chloro-2,3 - epoxypropane | 217.0 |
| 4 - (diethylamino)benzene diazonium chlorozincate | 23.6 |
| 1-hydroxy-2-naphthoyl piperidide | 11.8 |
| 2-hydroxy-3-naphth-o-anisidide | 15.5 |
| 2 - (2,6 - diethylphenylimino) - 3 - hexadecyl-5-(2-methoxybenzylidene)thiazolidone | 8.69 |

After a Xenon arc exposure as in Example I, the loss in density is 18% for the blue dye and 24% for the yellow dye.

EXAMPLE III

A diazotype photographic element is prepared according to the procedure of Example I, except that copoly (vinyl chloride/vinyl acetate) with 91% vinyl chloride and 9% partially hydrolized vinyl acetate is used in lieu of the cellulose acetate. After a Xenon arc exposure as in Example I, the loss in density is 17% for the blue dye and 15% for the yellow dye.

EXAMPLE IV

A diazotype photographic element is prepared according to the procedure of Example I, except that polyvinyl butyral with approximately a 21% hydroxyl content is employed in lieu of cellulose acetate. After a Xenon arc exposure as in Example I, the loss in density is 29% for the blue dye and 27% for the yellow dye.

EXAMPLE V

Diazotype photographic elements are prepared according to the procedures of Examples I through IV, with three elements being prepared according to the formulation of each previous example except that phenolic dye stabilizers are added. In one of each pair of the four types of elements, two equivalents of 2,2'-methylene bis[6-(1-methylcyclohexyl)-4-methyl]phenol (Stabilizer A) is added, based on the amount of diazonium salt. In the second of each of the four types of element, two equivalents of 4-isopropyl - 2,2 - dimethyl - 7 - tert - butyl - 6 - chromanol is added, based on the weight of diazonium salt. In the third of each of the four types of element, a combination of equal amounts of Stabilizers A and B is added totalling two equivalents based on the weight of diazonium salt. The increases in stability as compared with the results of Examples I through IV are summarized below in tabular form.

EXAMPLE VI

A diazotype emulsion and photographic element is prepared according to the procedure of Example I, except that 3-hydroxy - N - (2,4 - dimethoxy - 5 - chlorophenyl)-2-naphthamide is substituted for the 1-hydroxy-2-naphthoylpiperidide. Additional elements are prepared wherein equivalent amounts of the following polymers are substituted for the cellulose acetate:

(a) poly(ethylene/isophthalate-co-terephthalate)(60:40)
(b) postchlorinated poly(vinyl chloride)
(c) copoly(p-cyclohexane dicarboxylic acid/2,2,-4,4-tetramethyl cyclobutane-1,3-diol)(1:1)
(d) terpoly(p-cyclohexane dicarboxylic acid/isophthalic acid/cyclohexylene bismethanol)(9:1:10)
(e) terpoly(p-cyclohexane dicarboxylic acid/isophthalic acid/cyclohexylene bismethanol)(6:4:10)

The elements are developed and Xenon arc exposed as in Example I. Fading is as expressed below:

| Polymer | Percent fade yellow | Percent fade blue |
|---|---|---|
| Cellusose acetate | 45 | 33 |
| Polymer a | 20 | 12 |
| Polymer b | 24 | 19 |
| Polymer c | 21 | 30 |
| Polymer d | 12 | 16 |
| Polymer e | 5.5 | 11 |

EXAMPLE VII

Molar portions of 4-(diethylamino)benzene diazonium chlorozincate and 2-hydroxy - 3 - naphthoyl-o-anisidide are coupled in an alkaline medium to yield a blue colored azo dye. One part by weight of the resultant blue azo dye is admixed with 17 parts by weight of the following polymers:

(a) cellulose acetate (40% acetal)
(b) cellulose butyrate
(c) cellulose acetate butyrate (27% acetal)
(d) copoly(ethylacrylate/acrylic acid)(80:20)
(e) poly(vinyl butyral) 9% hydroxylated aldehyde units)
(f) copoly(vinyl chloride/vinyl acetate)(9:1)
(g) polyvinyl acetate (molecular weight about 90,000)
(h) copoly(4,4'-isopropylidenebisphenol/1-chloro-2,3-epoxypropane)(1:1)

The mixtures of dye and polymer are coated on cellulose acetate film support and then dried and Xenon arc exposed as described in Example I. The resultant dye fade is summarized in tabular form:

| Polymer: | Percent fade |
|---|---|
| a | 55 |
| b | 60.5 |
| c | 59 |
| d | 30 |
| e | 41 |
| f | 30 |
| g | 46 |
| h | 21 |

Polymers a through c are typical polymeric binders for azo dyes. Polymers d through h are polymers of the subject invention.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. In a diazotype composition which is useful as a reproduction medium and which comprises at least one light-sensitive diazonium salt and at least one coupler which can react with said diazonium salt to form an azo dye, wherein the diazonium salt and the coupler are dispersed in a polymeric binder material, the improvement which comprises using as the binder material, in an amount of about 100 parts by weight per 20 to 40 parts by weight of dye-forming ingredients, a polymer selected from the group consisting of:
   (a) copolymers of vinyl chloride and vinyl acetate,
   (b) polyvinylbutyral homopolymers,
   (c) polyvinylacetate homopolymers,
   (d) copolymers of 4,4' - isopropylidenebisphenol and 1-chloro-2,3-epoxypropane,
   (e) terpolymers of ethylene glycol, isophthalic acid and terephthalic acid,
   (f) polyvinyl chloride homopolymers,
   (g) terpolymers of p-cyclohexanedicarboxylic acid, isophthalic acid and cyclohexylenebismethanol,
   (h) copolymers of p-cyclohexanedicarboxylic acid and 2,2,4,4-tetramethylcyclobutane-1,3-diol, and
   (i) copolymers of ethyl acrylate and acrylic acid, said composition also including an acidic stabilizing compound and a hindered phenol in sufficient amounts to inhibit fading of said azo dye wherein the acidic stabilizing compound and the hindered phenol are dispersed in the polymeric binder material, said hindered phenol having a formula selected from the group consisting of:

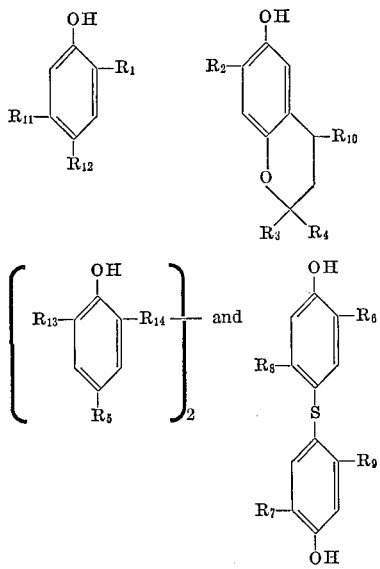

wherein: $R_1$ is a tertiary alkyl radical having 4–8 carbon atoms; $R_2$ is a straight chain radical having 9–18 carbon atoms or a branched chain alkyl radical having 1–18 carbon atoms; $R_3$, $R_4$, and $R_5$ are each a lower alkyl radical; $R_6$ and $R_7$ are each a tertiary alkyl radical having 4–8 carbon atoms; $R_8$ and $R_9$ are each an alkyl radical; $R_{10}$ is a hydrogen atom or a lower alkyl radical; $R_{11}$ is a hydrogen atom when $R_{12}$ is an alkyl radical; $R_{11}$ is a tertiary alkyl radical having 4–8 carbon atoms when $R_{12}$ is a hydroxyl radical; $R_{11}$ is a hydrogen atom or a tertiary alkyl radical having 4–8 carbon atoms when $R_{12}$ is an alkoxy radical; $R_{13}$ is a tertiary alkyl radical having 4–8 carbon atoms or a cycloalkyl radical having 4–6 nuclear carbon atoms; $R_{14}$ is a lower alkylene radical.

2. A diazotype composition as described in claim 1 wherein the said polymeric binder material is further selected from the group consisting of:
   (a) copolymers of vinyl chloride and vinyl acetate wherein the ratio of vinyl chloride units to vinyl acetate units is from about 4:1 to about 19:1,
   (b) polyvinylbutyral homopolymers having from about 9% to about 21% hydroxylated aldehyde units,
   (c) polyvinylacetate homopolymers wherein the molecular weight varies from about 70,000 to about 110,000,
   (d) copolymers of 4,4' - isopropylidenebisphenol and 1-chloro - 2,3 - epoxypropane wherein the molecular weight is from about 50,000 to about 150,000,
   (e) terpolymers of ethylene glycol, isophthalic acid and terephthalic acid wherein the ratio of ethylene moieties to total acid units varies from about 4:6 to about 6:4,
   (f) postchlorinated polyvinyl chloride homopolymers,
   (g) terpolymers of p-cyclohexanedicarboxylic acid; isophthalic acid; and cyclohexylenebismethanol wherein the ratio of units varies respectively from about 6:4:10 to about 9:1:10,
   (h) copolymers of p-cyclohexanedicarboxylic acid and 2,2,4,4-tetramethylcyclobutane - 1,3 - diol wherein the ratio of units varies respectively from about 3:2 to about 2:3, and
   (i) copolymers of ethyl acrylate and acrylic acid wherein the ratio of units varies from about 9:1 to about 7:3 respectively.

3. A diazotype composition as described in claim 1 and further including couplers to form a blue azo dye and a yellow azo dye, wherein the diazonium salt has the formula:

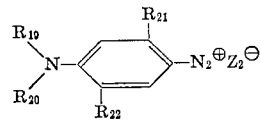

wherein:
   (a) each of $R_{19}$ and $R_{20}$, when taken alone, is a lower alkyl radical,
   (b) $R_{19}$ and $R_{20}$, when taken together, represent the atoms necessary to complete a morpholino radical,
   (c) each of $R_{21}$ and $R_{22}$ is selected from the group consisting of a hydrogen atom, a lower alkyl radical, and a lower alkoxy radical,
   (d) $Z_2$ is an anion selected from the group consisting of a chlorozincate anion, a fluoroborate anion and a chlorostannate anion;

the blue coupler has the formula:

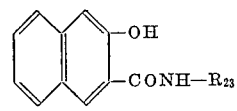

wherein $R_{23}$ is a phenyl radical; and the yellow coupler has a formula selected from the group consisting of:

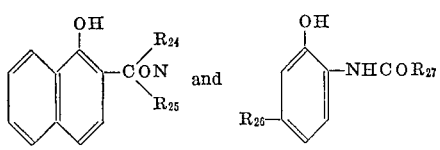

wherein:
   (a) each of $R_{24}$ and $R_{25}$, when taken alone, is selected from the group consisting of a hydrogen atom, an alkyl radical, a cycloalkyl radical, and aryl radical, an aralkyl radical and an aralkoxy radical,
   (b) $R_{24}$ and $R_{25}$, when taken together, are the atoms necessary to complete a six-membered hetero radical selected from the group consisting of a piperidino radical and a morpholino radical, (c) $R_{26}$ is selected from the group consisting of an alkyl radical and an alkoxy radical, and (d) $R_{27}$ is selected from the group consisting of an alkyl radical and an aryl radical.

4. A photographic element useful in diazotype reproduction, said photographic element comprising a support having coated thereon a diazotype composition as described in claim 3.

5. A photographic element as described in claim 4 wherein the said diazonium salt is 4-(diethylamino)benzene chlorozincate, the said blue coupler is 2-hydroxy-3-napth-o-anisidide and the said yellow coupler is 1-hydroxy-2-naphthoylpiperidide.

6. A photographic element as described in claim 5 except that the blue coupler is 3-hydroxy-N-(2,4-dimethoxy-5-chlorophenyl)-2-naphthamide.

References Cited
UNITED STATES PATENTS

| | | | |
|---|---|---|---|
| 2,501,874 | 3/1950 | Peterson | 96—91X |
| 2,613,149 | 10/1952 | Unkauf | 96—91 |
| 2,717,832 | 9/1955 | Sulich | 96—91 |
| 2,822,272 | 3/1958 | Kosalek et al. | 96—91 |
| 2,835,579 | 5/1958 | Thirtle et al. | 96—100X |
| 3,069,268 | 12/1962 | Herrick | 96—75X |
| 3,113,025 | 12/1963 | Bialczak | 96—49X |
| 3,169,864 | 2/1965 | Holmen | 96—91X |
| 3,248,220 | 4/1966 | Van Rhijn | 96—91 |
| 3,303,028 | 2/1967 | Aerbi et al. | 96—91 |
| 3,360,371 | 12/1967 | Munder et al. | 96—91 |
| 3,373,021 | 3/1968 | Adams et al. | 96—75X |
| 3,052,542 | 9/1962 | Sulich | 96—91X |
| 3,386,827 | 6/1968 | Abei et al. | 96—91 |

FOREIGN PATENTS

| | | | |
|---|---|---|---|
| 937,510 | 9/1963 | Great Britain | 96—91 |
| 980,376 | 1/1965 | Great Britain | 96—91 |

OTHER REFERENCES

Kosar, J.: "Light-Sensitive Systems," 1965, p. 223.

Dinaburg, M. S.: "Photosensitive Diazo Compounds," 1964, pp. 50–53.

NORMAN G. TORCHIN, Primary Examiner

C. L. BOWERS, JR., Assistant Examiner

U.S. Cl. X.R.

96—75, 49

PO-1050
(5/69)

UNITED STATES PATENT OFFICE
CERTIFICATE OF CORRECTION

Patent No. 3,573,052       Dated March 30, 1971

Inventor(s) William C. Gray and Frederick A. Stahly

It is certified that error appears in the above-identified patent and that said Letters Patent are hereby corrected as shown below:

Column 2, line 60, second formula, that portion of the form reading

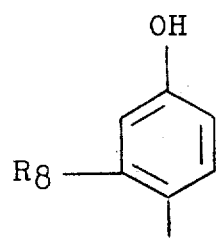    should read    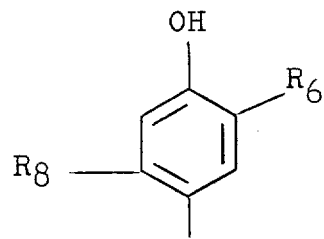

Column 6, line 35, the formula reading

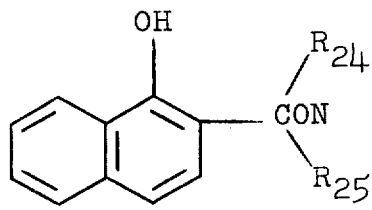    should read    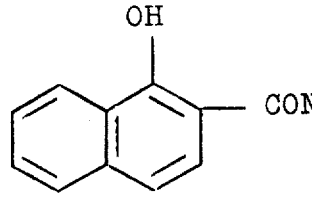

PO-1050
(5/69)

UNITED STATES PATENT OFFICE
CERTIFICATE OF CORRECTION

Patent No. 3,573,052          Dated March 30, 1971

Inventor(s) William C. Gray and Frederick A. Stahly

PAGE - 2
It is certified that error appears in the above-identified patent and that said Letters Patent are hereby corrected as shown below:

Column 12, line 63, first formula reading

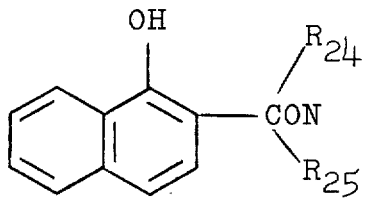

should read

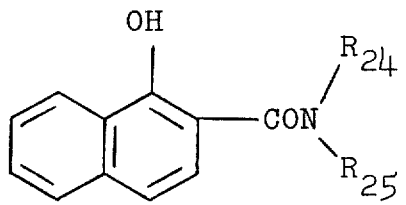

Signed and sealed this 31st day of August 1971.

(SEAL)
Attest:

EDWARD M. FLETCHER, JR.
Attesting Officer

ROBERT GOTTSCHALK
Acting Commissioner of Patent